US011347235B2

(12) United States Patent
Losh et al.

(10) Patent No.: US 11,347,235 B2
(45) Date of Patent: May 31, 2022

(54) METHODS AND SYSTEMS FOR GENERATING RADAR MAPS

(71) Applicant: GM GLOBAL TECHNOLOGY OPERATIONS LLC, Detroit, MI (US)

(72) Inventors: Michael A. Losh, Rochester Hills, MI (US); Keun Jae Kim, Rochester Hills, MI (US); Orhan Bulan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 16/386,441

(22) Filed: Apr. 17, 2019

(65) Prior Publication Data

US 2020/0333798 A1   Oct. 22, 2020

(51) Int. Cl.
| | | |
|---|---|---|
| *G01S 13/02* | (2006.01) | |
| *G01S 13/93* | (2020.01) | |
| *G01S 13/89* | (2006.01) | |
| *G05D 1/02* | (2020.01) | |
| *G01S 13/931* | (2020.01) | |

(52) U.S. Cl.
CPC ............ *G05D 1/0257* (2013.01); *G01S 13/89* (2013.01); *G01S 13/931* (2013.01); *G05D 1/0221* (2013.01); *G05D 2201/0213* (2013.01)

(58) Field of Classification Search
CPC .. G05D 1/0257; G05D 1/0221; G05D 1/0231; G05D 1/0246; G05D 1/0274; G05D 1/0276; G05D 1/0278; G05D 2201/0213; G01S 7/417; G01S 13/89; G01S 13/931
See application file for complete search history.

(56) References Cited

U.S. PATENT DOCUMENTS

| | | | | |
|---|---|---|---|---|
| 2018/0045519 A1* | 2/2018 | Ghadiok | ............. | G06K 9/2054 |
| 2019/0147255 A1* | 5/2019 | Homayounfar | ...... | G06N 3/0454 |
| | | | | 701/23 |
| 2019/0204092 A1* | 7/2019 | Wheeler | ............. | G05D 1/0246 |
| 2019/0286921 A1* | 9/2019 | Liang | ........................ | G06T 7/70 |

\* cited by examiner

*Primary Examiner* — Anshul Sood
(74) *Attorney, Agent, or Firm* — Lorenz & Kopf LLP

(57) ABSTRACT

Systems and methods are provided for generating a map for use in controlling a vehicle. In one embodiment, a method includes: receiving, by a processor, aerial image data depicting an environment; processing, by the processor, the aerial image data with a plurality of trained deep learning models to produce a predicted radar map; and controlling the vehicle based on the predicted radar map.

17 Claims, 7 Drawing Sheets

METHODS AND SYSTEMS FOR GENERATING RADAR MAPS

INTRODUCTION

The present disclosure generally relates to vehicles, and more particularly relates to generating radar type maps using aerial maps and using the radar type maps to control the vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles make use of maps to determine their location, for example, within the environment and in particular within lane boundaries and use that location to navigate the vehicle. Some maps are obtained from a vehicle dedicated to mapping that drives around and collects map information by way of its sensors. This method can be expensive and time consuming. Furthermore, the environment may change thus, requiring constant updating of the maps.

Accordingly, it is desirable to provide improved systems and methods for generating maps for use by a vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for generating maps for use in controlling a vehicle. In one embodiment, a method includes: receiving, by a processor, aerial image data depicting an environment; processing, by the processor, the aerial image data with a plurality of trained deep learning models to produce a predicted radar map; and controlling the vehicle based on the predicted radar map.

In various embodiments, the plurality of trained deep learning models includes a residential model, a highway model, a suburban model, an urban model, and a rural model. In various embodiments, the processing the aerial image data comprises: producing a softmax output for each of a plurality of classes, wherein the producing the softmax output for reach of the plurality of classes is produced for each of the residential model, the highway model, the suburban model, the urban model, and the rural model; combining the softmax output for each class of the plurality of classes from each of the plurality of models based on a maximum pixel value; and combining the softmax output from each class to produce the predicted radar map.

In various embodiments, the method includes generating a histogram based on the aerial image data, and wherein the processing the aerial image data is based on the histogram. In various embodiments, the method includes: determining a plurality of classes associated with the histogram; generating an image for each of the plurality of classes; and wherein the processing the aerial data is based on the images.

In various embodiments, the determining the plurality of classes is based on a mode of a pixel value in the class.

In various embodiments, the method includes training the plurality of deep learning model based on a set of data comprising aerial images and labeled radar images.

In various embodiments, the method includes optimizing hyper-parameters of the deep learning model during the training.

In various embodiments, the hyper-parameters include a number of layers, a filter size, a filter depth, class weights in a loss function, and a number of epochs.

In various embodiments, the predicted radar map includes radar reflectivity values.

In another embodiment, a system includes: a data storage device that stores a plurality of trained deep learning models; and a controller configured to, by a processor, receive aerial image data depicting an environment of the vehicle, process the aerial image data with the plurality of trained deep learning models to produce a predicted radar map, and control the vehicle based on the predicted radar map.

In various embodiments, the plurality of trained deep learning models includes a residential model, a highway model, a suburban model, an urban model, and a rural model.

In various embodiments, the controller processes the aerial image data by: producing a softmax output for each of a plurality of classes, wherein the producing the softmax output for reach of the plurality of classes is produced for each of the residential model, the highway model, the suburban model, the urban model, and the rural model; combining the softmax output for each class of the plurality of classes from each of the plurality of models based on a maximum pixel value; and combining the softmax output from each class to produce the predicted radar map.

In various embodiments, the controller is further configured to generate a histogram based on the aerial image data, and wherein process the aerial image data based on the histogram.

In various embodiments, the controller is further configured to determine a plurality of classes associated with the histogram, generate an image for each of the plurality of classes, and wherein process the aerial data based on the images. In various embodiments, the controller is further configured to determine the plurality of classes based on a mode of a pixel value in the class.

In various embodiments, the controller is further configured to train the plurality of deep learning model based on a set of data comprising aerial images and labeled radar images.

In various embodiments, the controller is further configured to optimize hyper-parameters of the deep learning model during the training.

In various embodiments, the hyper-parameters include a number of layers, a filter size, a filter depth, class weights in a loss function, and a number of epochs.

In yet another embodiment, a vehicle includes: a data storage device that stores a plurality of trained deep learning models, wherein the trained deep learning models include a residential model, a highway model, a suburban model, an urban model, and a rural model; and a controller configured to, by a processor, receive aerial image data depicting an environment of the vehicle, process the aerial image data with the plurality of trained deep learning models to produce a predicted radar map, and control the vehicle based on the predicted radar map.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
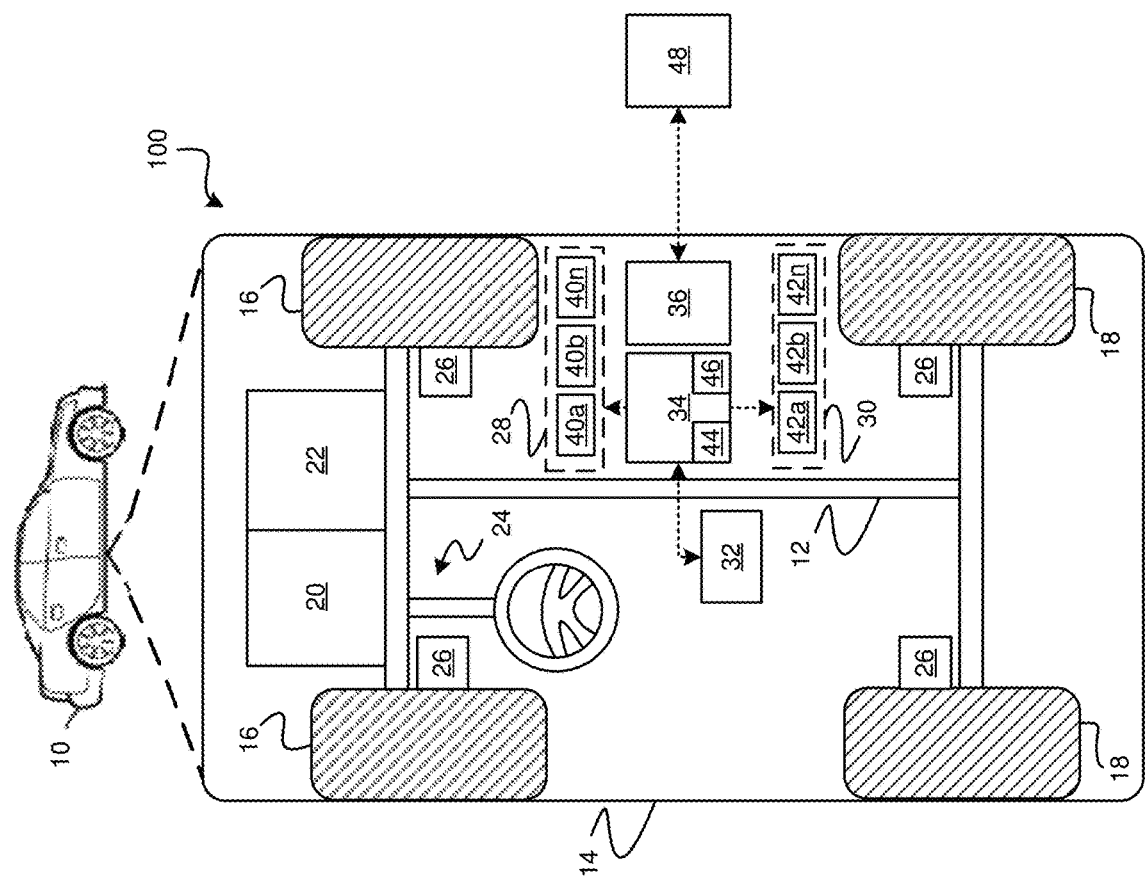
FIG. 1 is a functional block diagram illustrating an autonomous vehicle having a mapping system, in accordance with various embodiments.

With reference to FIG. 1, a mapping system shown generally at 100 is associated with a vehicle 10 in accordance with various embodiments. In general, the mapping system 100 processes data provided by one or more aerial sensors, hereinafter referred to as aerial data, to determine a map of the environment. In various embodiments, the aerial data includes images representing top down view of the environment. In various embodiments, the map is represented in a radar type format such as a reflectivity grid format, which encodes the predicted intensity of radar reflection as a top-down image where each pixel represents the radar reflectivity of any compact or extended object(s) found at the horizontal grid coordinates for the pixel, and may come from any physical feature that might reflect radio energy from the perspective of a vehicle traveling along a road covering or nearby a driven road. Example reflective objects relevant to mapping of roads include road edge curbs, guard rails, fences, utility poles, road sign poles or gantries, lane barriers, and building outlines. As can be appreciated, the map can be represented in other formats or even encode other physical sensing modalities, including lidar reflectivity formats or other formats. In various embodiments, the mapping system 100 converts the aerial data to radar data using machine learning techniques. The use of machine learning allows for a conversion process having one or more steps.

The mapping system 100 may then use the map to localize the vehicle 10 as the vehicle travels. The vehicle 10 then intelligently navigates based on the localization. As shown in FIG. 1, the mapping system is located onboard the vehicle 10. As can be appreciated, in various other embodiments, the mapping system 100 can be implemented on a system remote from the vehicle 10 (or on a system remote from the vehicle 10) and the map may be downloaded to the vehicle 10 for use in localizing the vehicle. For exemplary purposes, the disclosure will be discussed in the context of the mapping system 100 being implemented onboard the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the mapping system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can implement any level of automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the localization system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
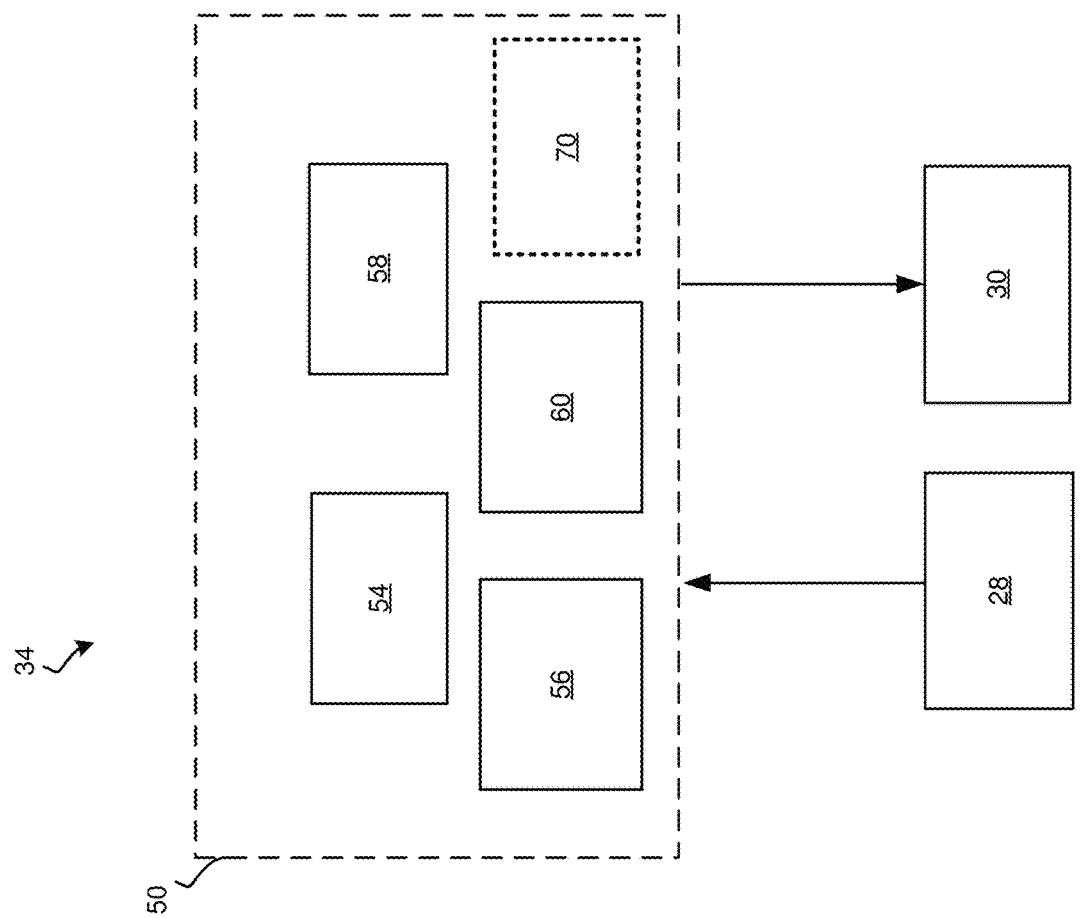
FIG. 2 is a dataflow diagrams illustrating an autonomous driving system that includes the mapping system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps include the maps generated from the mapping system 100. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the mapping system 100 and, when executed by the processor 44, process aerial data to determine the map of the environment. For example, the mapping system 100 generates a radar map from the aerial data that includes aerial images (e.g., taken by a camera from above) of the environment.

As can be appreciated, the subject matter disclosed herein provides certain enhanced features and functionality to what may be considered as a standard or baseline autonomous vehicle 10 and/or an autonomous vehicle based remote transportation system (not shown) that coordinates the autonomous vehicle 10. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, all or parts of the mapping system 100 of FIG. 1 may be included within the ADS 50, for example, as mapping system 70. For example, the mapping 70 receives aerial data from a remote source 72 and provides maps to the positioning system 56 for determining a location of the vehicle 10 relative to the environment.

Figure 3:
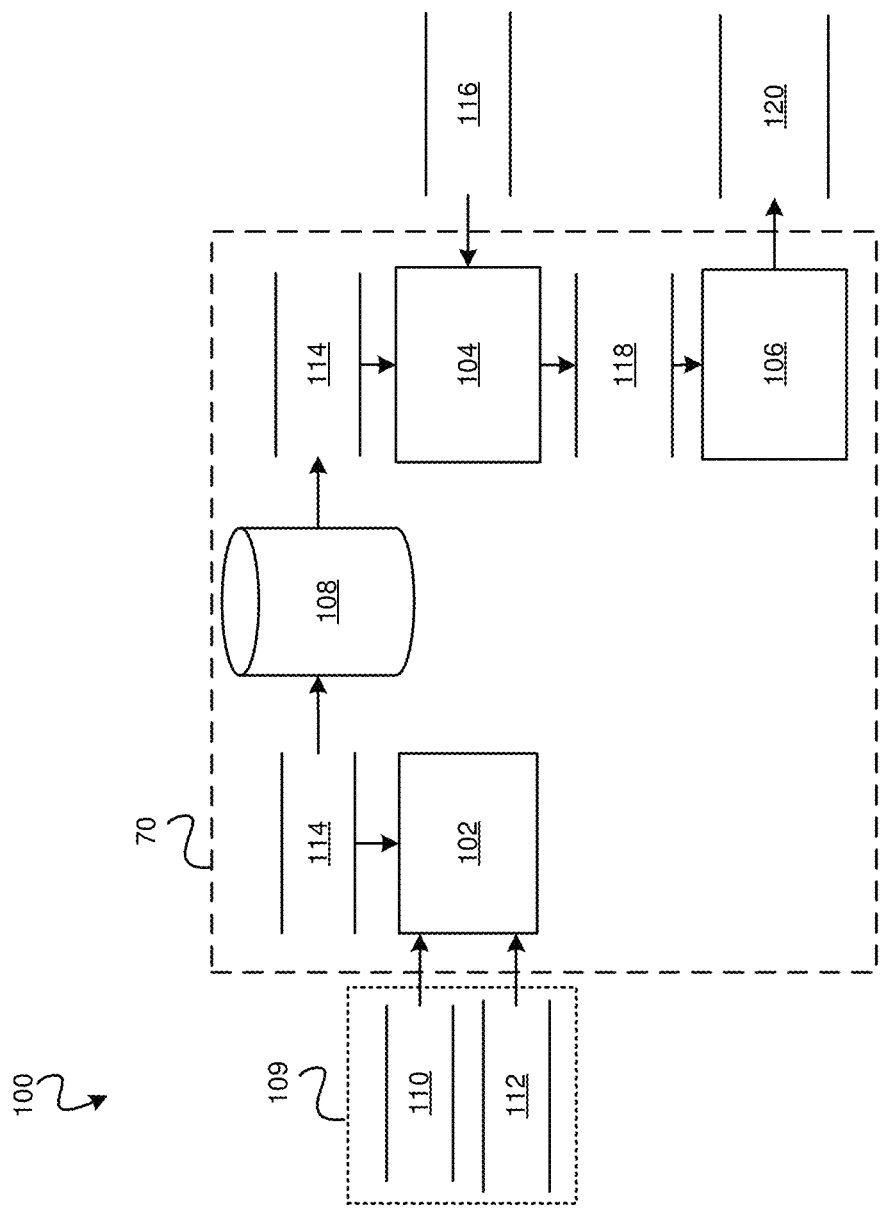
FIG. 3 is a dataflow diagram illustrating the mapping system, in accordance with various embodiments.

As shown in more detail with regard to FIG. 3 and with continued reference to FIGS. 1 and 2, the mapping system 70 includes a training module 102, an aerial data processing module 104, a radar map prediction module 108, and a model datastore 110.

The training module 102 receives as input training data 109 that includes a set of aerial images 110 and corresponding radar images 112. In various embodiments, the training module 102 may receive multiple sets of images 110, 112, each set corresponding to a certain geographic type of the area depicted in the images. For example, the different geographic types can include residential, highway, suburban, urban, and rural. As can be appreciated other geographic types can be included, in various embodiments.

Figure 4:
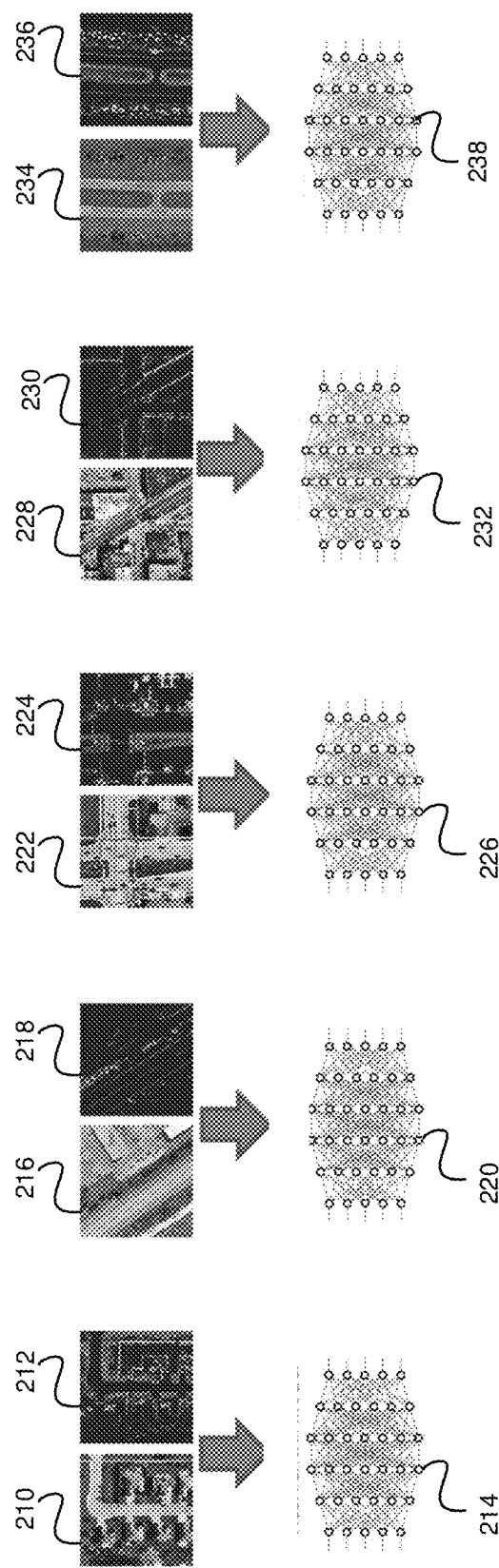
FIG. 4 is an illustration of training steps that may be performed by the mapping system, in accordance with various embodiments.

The training module 102 trains a deep learning model for each geographic type based on the set of images 110, 112 corresponding to the particular geographic type. For example, as shown in FIG. 4, a set of residential images 210, 212 are used to train a residential model 214. A set of highway images 216, 218 are used to train a highway model 220. A set of suburban images 222, 224 are used to train a suburban model 226. A set of urban images 228, 230 are used to train an urban model 232. A set of rural images 234, 236 are used to train a highway model 238.

During training, the architecture and/or the hyper-parameters of each model 214, 220, 226, 232, 238 are optimized. The hyper-parameters can include the number of layers, the filter size and depth, the class weights in the loss function, and the number of epochs. For example, the number of classes and the class weights can be defined and optimized as shown in FIG. 5.

Figure 5:
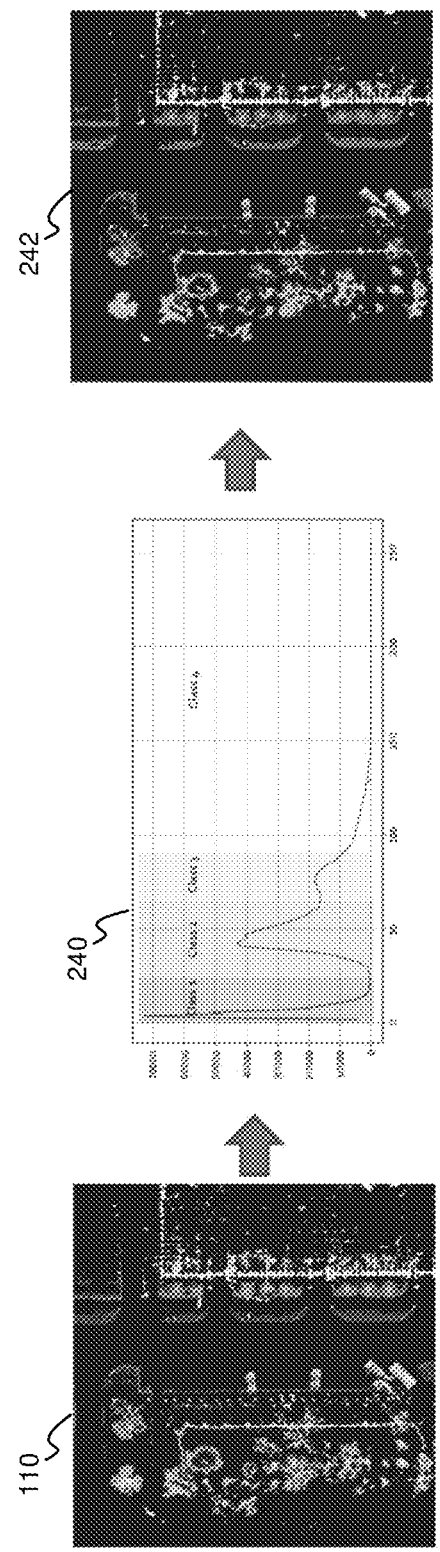
FIG. 5 is an illustration of prediction steps that may be performed by the mapping system, in accordance with various embodiments.

In FIG. 5, the aerial images 110 are pre-processed to produce a processed image 242. In various embodiments, during pre-processing, an image histogram 240 is produced. The image histogram 240 includes a graphical representation of the tonal distribution in the aerial image 110 and plots the number of pixels for each tonal value. The image is then clustered into four classes (class 1, class 2, class 3, and class 4). As can be appreciated, any number of classes can be implemented in various embodiments. The pixel values in each class are then replaced with the mode of the pixel values in their respective class. The mode can be the mean, the median, or the maximum of pixel values in the group.

In addition to the pre-processing, a weight can be computed for each class based on, for example:

$$Weight_{class\,i} = \frac{\text{Number of Pixels class } i}{\sum_i^n \text{Number of Pixels class } i}. \quad [1]$$

The computed weights are then used as the parameters of a loss function of the deep learning models. As shown in FIG. 5, the original image 110 is 8-bit, thus, each pixel in an image can take one of 256 values. Since each model must learn the mapping between a pixel in the aerial image 110 to a pixel in a radar image, it must learn to classify 256 classes. By pre-processing the initial image, the number of classes is reduced, and each model can be trained quicker and can generalize better.

With reference back to FIG. 3, the trained deep learning models 114 are then saved in the model datastore 108.

The aerial data processing module 104 receives as input aerial data 116. The aerial data 116 is pre-processed as discussed above based on the classes. The aerial data processing module 104 retrieves the trained models 114 from the model datastore 108 and processes the pre-processed aerial data 116 with each of the trained models 114. The trained models each produce softmax outputs 118 for each class.

Figure 6:
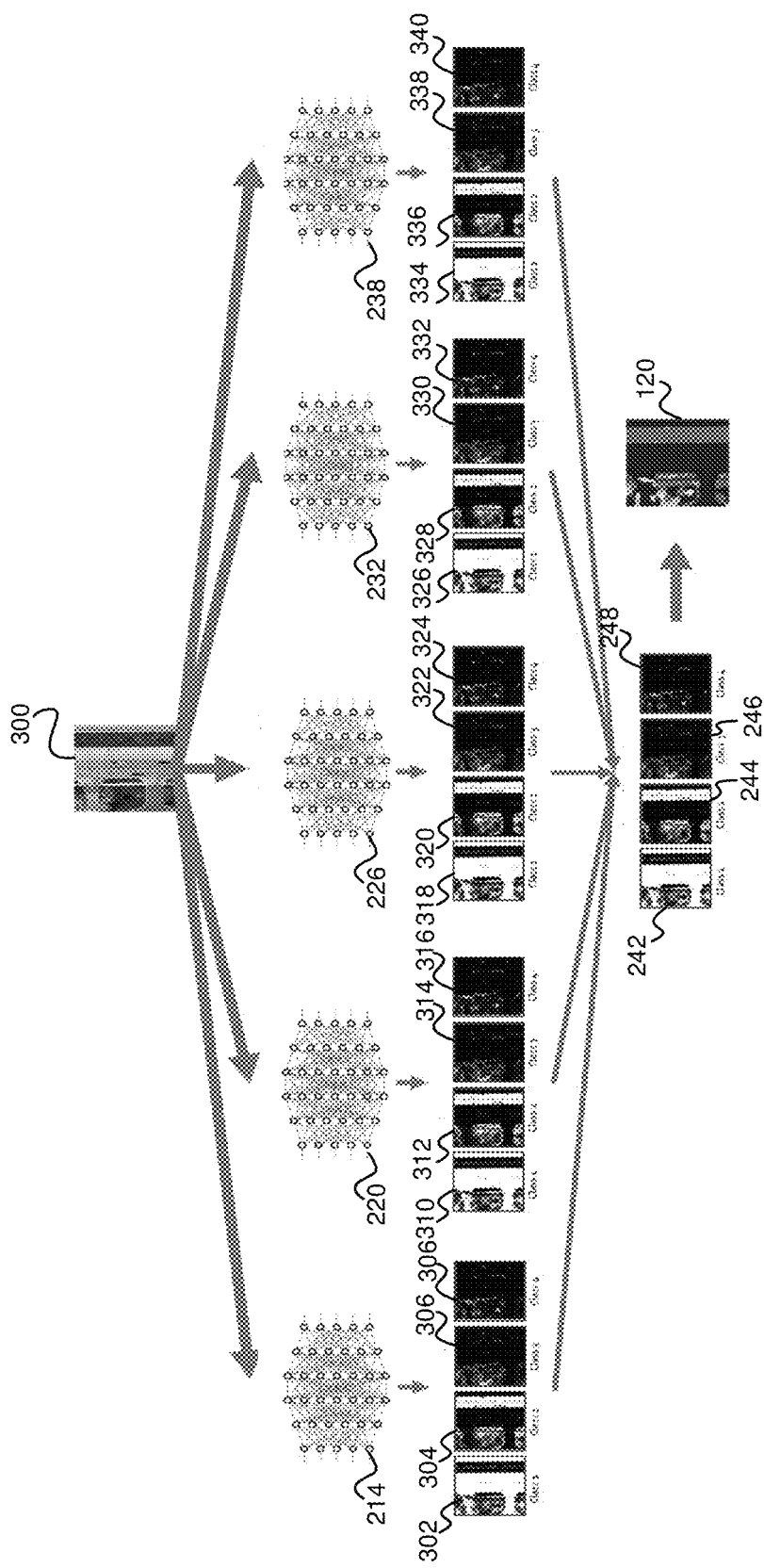
FIG. 6 is an illustration of the modeling steps that may be performed by the mapping system, in accordance with various embodiments.

For example, as shown in FIG. 6, aerial data 300 is received, and processed with the residential model 214, the highway model 220, the suburban model 226, the urban model 232, and the rural model 238. The processing by the residential model 214 produces softmax outputs for class 1 302, class 2 304, class 3 306, and class 4 308. The processing by the highway model 220 produces softmax outputs for class 1 310, class 2 312, class 3 314, and class 4 316. The processing by the suburban model 226 produces softmax outputs for class 1 318, class 2 320, class 3 322, and class 4 324. The processing by the urban model 232 produces softmax outputs for class 1 326, class 2 328, class 3 330, and class 4 332. The processing by the rural model 238 produces softmax outputs (or probability values) for class 1 234, class 2 236, class 3 238, and class 4 240.

With reference back to FIG. 3, the radar map prediction module 106 receives as input the softmax outputs 118 from the models 114. The radar map prediction module 106 produces a predicted radar map 120 from the softmax outputs 118. For example, as shown in FIG. 6, the radar map prediction module 106 combines the softmax outputs 302-340 in each class from each of the models 214, 220, 226, 232, 238 to produce a final softmax output in class 1 242, class 2 244, class 3 246, and class 4 248. In various embodiments, the radar map prediction module 106 combines the softmax outputs by taking the maximum pixel from the outputs in the corresponding class and then normalized over 4 classes for each pixel. The radar map prediction module 106 then converts the maximum softmax outputs for class 1 242, class 2 244, class 3, and class 4 into the predicted radar map 120. For example, for each pixel location in the four images, the highest values are selected. For e.g. If pixel at (1,1) has 0.7 for class 1 image and 0.1 for the rest. The final radar image for pixel at (1,1) is assigned as class 1 of radar pixel value. The mapping between classes to radar reflectivity values is manually set (e.g. class 1=10, class 2=30, class 3=80, class 4=200).

The predicted radar map 120 is then stored and/or made available for use in controlling the vehicle 10.

Figure 7:
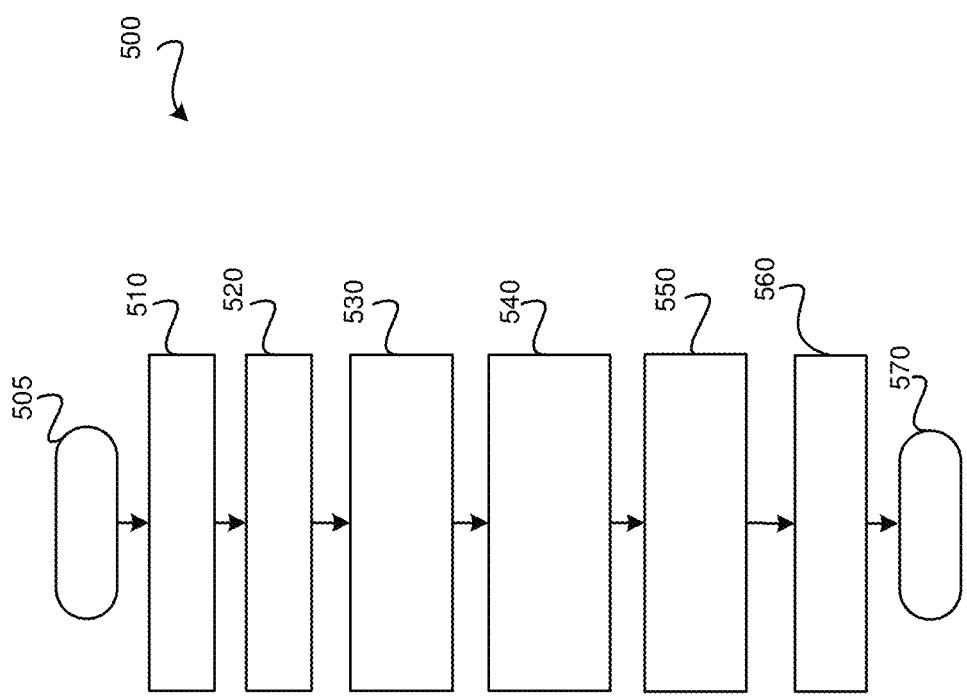
FIG. 7 is an illustration of a mapping method that may be performed by the mapping system, in accordance with various embodiments.

With reference now to FIG. 7 and with continued reference to FIGS. 1-3, a flowchart illustrates a mapping method 500 that can be performed by the mapping system 100 in accordance with various embodiments. As can be appreciated, in light of the disclosure, the order of operation within the method 500 is not limited to the sequential execution as illustrated in FIG. 7 but may be performed in one or more varying orders as applicable and in accordance with the present disclosure. In various embodiments, the method 500 can be scheduled to run based on one or more predetermined events, and/or can run continuously during operation of the autonomous vehicle 10.

Prior to performing the method 500, the models 114 are trained using the training sets of aerial data and labeled radar data as discussed above.

Thereafter, the method 500 may begin at 505. The aerial data 116 is received and pre-processed at 510. The models 114 (e.g., the residential model, the highway model, the suburban model, the urban model, and the rural model) are retrieved from the model datastore 108 at 520. The aerial data 116 is processed using each of the trained models 114 to obtain the softmax outputs 118 for each class (e.g., class 1, class 2, class 3, and class 4) at 530. The softmax outputs 118 from each of the models 114 are combined into the final softmax output for each class by taking the maximum softmax output per pixel at 540. The final softmax outputs are then converted to the predicted radar map 120 at 550 and stored in a data storage device 46 for use in controlling the vehicle 10 at 560. Thereafter, the method may end at 570.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
    receiving, by a processor, aerial image data from a camera, the aerial image data depicting a top-down view of an environment;
    processing, by the processor, the aerial image data with each of a plurality of trained deep learning models to produce a respective output, wherein the plurality of trained deep learning models comprise a residential model, a highway model, a suburban model, an urban model, and a rural model;
    generating a predicted radar map based on a combination of the respective outputs from the plurality of trained deep learning models, the predicted radar map including radar reflectivity data; and
    controlling the vehicle based on the predicted radar map.

2. The method of claim 1, wherein the processing the aerial image data comprises:
    producing a softmax output for each of a plurality of classes, wherein the producing the softmax output for each of the plurality of classes is produced for each of the residential model, the highway model, the suburban model, the urban model, and the rural model;
    combining the softmax output for each class of the plurality of classes from each of the plurality of models based on a maximum pixel value; and
    combining the softmax output from each class to produce the predicted radar map.

3. The method of claim 1, further comprising generating a histogram based on the aerial image data, and wherein the processing the aerial image data is based on the histogram.

4. The method of claim 3, further comprising:
    determining a plurality of classes associated with the histogram;
    generating an image for each of the plurality of classes; and
    wherein the processing the aerial data is based on the images.

5. The method of claim 4, wherein the determining the plurality of classes is based on a mode of a pixel value in the class.

6. The method of claim 1, further comprising training the plurality of deep learning models based on a set of data comprising aerial images and labeled radar images.

7. The method of claim 6, further comprising optimizing hyper-parameters of the deep learning model during the training.

8. The method of claim 7, wherein the hyper-parameters comprise a number of layers, a filter size, a filter depth, class weights in a loss function, and a number of epochs.

9. A system for controlling a vehicle, comprising:
    a data storage device that stores a plurality of trained deep learning models, wherein the plurality of trained deep learning models comprise a residential model, a highway model, a suburban model, an urban model, and a rural model; and
    a controller configured to, by a processor, receive aerial image data from a camera, the aerial image data depicting a top-down view of an environment, process the aerial image data with each of the plurality of trained deep learning models to produce a respective output, generate a predicted radar map based on a combination of the respective outputs from the plurality of trained deep learning models, the predicted radar map including radar reflectivity data, and control the vehicle based on the predicted radar map.

10. The system of claim 9, wherein the controller processes the aerial image data by:
- producing a softmax output for each of a plurality of classes, wherein the producing the softmax output for each of the plurality of classes is produced for each of the residential model, the highway model, the suburban model, the urban model, and the rural model;
- combining the softmax output for each class of the plurality of classes from each of the plurality of models based on a maximum pixel value; and
- combining the softmax output from each class to produce the predicted radar map.

11. The system of claim 9, wherein the controller is further configured to generate a histogram based on the aerial image data, and process the aerial image data based on the histogram.

12. The system of claim 11, wherein the controller is further configured to determine a plurality of classes associated with the histogram, generate an image for each of the plurality of classes, and process the aerial data based on the images.

13. The system of claim 12, wherein the controller is further configured to determine the plurality of classes based on a mode of a pixel value in the class.

14. The system of claim 9, wherein the controller is further configured to train the plurality of deep learning models based on a set of data comprising aerial images and labeled radar images.

15. The system of claim 14, wherein the controller is further configured to optimize hyper-parameters of the deep learning model during the training.

16. The system of claim 15, wherein the hyper-parameters comprise a number of layers, a filter size, a filter depth, class weights in a loss function, and a number of epochs.

17. A vehicle, comprising:
- a data storage device that stores a plurality of trained deep learning models, wherein the trained deep learning models comprise a residential model, a highway model, a suburban model, an urban model, and a rural model; and
- a controller configured to, by a processor, receive aerial image data from a camera, the aerial image data depicting a top-down view of an environment, process the aerial image data with each of the plurality of trained deep learning models to produce a softmax output for each of a plurality of classes of the respective trained deep learning model, generate a predicted radar map based on a combination of the softmax outputs from the plurality of classes of the plurality of trained deep learning models, the predicted radar map including radar reflectivity data, and control the vehicle based on the predicted radar map,
- wherein the processing the aerial image data comprises producing a softmax output for each of a plurality of classes.

* * * * *